United States Patent
Takano et al.

(10) Patent No.: US 9,445,616 B2
(45) Date of Patent: Sep. 20, 2016

(54) AROMA COMPONENTS FOR IMPROVING EGG FLAVOR, AND EGG FLAVOR ENHANCERS

(71) Applicant: TableMark Co., Ltd., Tokyo (JP)

(72) Inventors: Yasuko Takano, Tokyo (JP); Junko Tanizawa, Tokyo (JP)

(73) Assignee: TableMark Co., Ltd., Tokyo (JP)

( * ) Notice: Subject to any disclaimer, the term of this patent is extended or adjusted under 35 U.S.C. 154(b) by 0 days.

(21) Appl. No.: 13/829,114

(22) Filed: Mar. 14, 2013

(65) Prior Publication Data

US 2013/0243934 A1 Sep. 19, 2013

(30) Foreign Application Priority Data

Mar. 19, 2012 (JP) ................. 2012-062176

(51) Int. Cl.
*A23L 1/22* (2006.01)
*A23L 1/32* (2006.01)
*A23L 1/226* (2006.01)
*A23L 1/23* (2006.01)

(52) U.S. Cl.
CPC ........ *A23L 1/22091* (2013.01); *A23L 1/22621* (2013.01); *A23L 1/22657* (2013.01); *A23L 1/22678* (2013.01); *A23L 1/23* (2013.01); *A23L 1/3212* (2013.01); *A23V 2200/00* (2013.01)

(58) Field of Classification Search
CPC ............... A23L 1/22008; A23L 1/232; A23L 1/22016; A23L 1/22002; A23L 1/3212; A23L 1/22621; A23L 1/22657; A23L 1/22678; A23L 1/22091; A23L 1/23; A23L 1/00; A23L 1/22; A23L 1/226; A23L 1/22614; A23L 1/22664; A23L 1/30; A23L 1/3016; A23L 1/3018; A23L 1/32; A23V 2200/00; A23V 2200/15; A23V 2250/218; A23V 2250/00
USPC .................................. 426/650, 531
See application file for complete search history.

(56) References Cited

U.S. PATENT DOCUMENTS 3,987,212 A * 10/1976 Seeley et al. ................. 426/614
2012/0201944 A1* 8/2012 Tanizawa ............... A23G 1/423
426/536

FOREIGN PATENT DOCUMENTS

| JP | 9-140348 A | 6/1997 |
|---|---|---|
| JP | 10-327802 A | 12/1998 |
| JP | 2005-102549 A | 4/2005 |
| JP | 2006-94809 A | 4/2006 |
| JP | 2010-220520 A | 10/2010 |
| JP | 2012-161268 A | 8/2012 |
| JP | 2012-161270 A | 8/2012 |
| WO | WO 99/16860 A1 | 4/1999 |

OTHER PUBLICATIONS

Ames, J.M., et al. Aroma components of a yeast Extracts, Flav. & Frag. Jour. 7 (1992) 89-103.*
Etschmann, M.M.W., et al., Production of aroma chemical 3-(methylthio)-1-propanol and 3-(methylthio)-propylacetate with yeasts., Appl. Microbiol. Biotechnol. 80 (2008) 579-587.*
Fushimi et al. 2008. "Taste and Flavor Functions of High Nucleic Acid Yeast Extract VERTEX IG 20." A Technical Journal of Food Chemistry and Chemicals. vol. 24, pp. 70-74. English translation included.*
Extended European Search Report issued Jul. 8, 2013, in European Patent Application No. 13159346.9.
Volatile Compounds in Food, Qualitative and Quantitative Data, 7th Ed. (1996) 53.1-53.7.
"Review on natural fragrance basic materials," Food Fragrance Handbook, Aug. 25, 2009, pp. 275, 306.

* cited by examiner

*Primary Examiner* — Nikki H Dees
(74) *Attorney, Agent, or Firm* — Birch, Stewart, Kolasch & Birch, LLP

(57) ABSTRACT

The present invention provides agent for enhancing egg aroma comprising at least one component(s) as an ingredient selected from the group consisting of: (a) 3-(methylthio)1-propanol, (b) benzaldehyde, (c) 4-heptanol, (d) trimethylpyrazine, (e) methylpyrazine, or (f) 2,5-dimethylpyrazine. The agent of the present invention is used for enhancing egg aroma, especially an egg flavor, of an egg product. The examples of preferred egg products to which the present invention is applied include, but not limited to, a boiled egg itself, various food products using a boiled egg (for example, tartar sauce, prepared bread filling, and so on), various food products containing an egg as a component (for example, mayonnaise, dressing, pasta sauce, Japanese omelette, steamed egg custard, steamed egg hotchpotch, omelette, quiche, rolled omelette, noodles, fried rice, custard cream, pudding, cake, sponge cake, ice cream, egg (custard) tart, bread, crape, and so on).

7 Claims, 1 Drawing Sheet

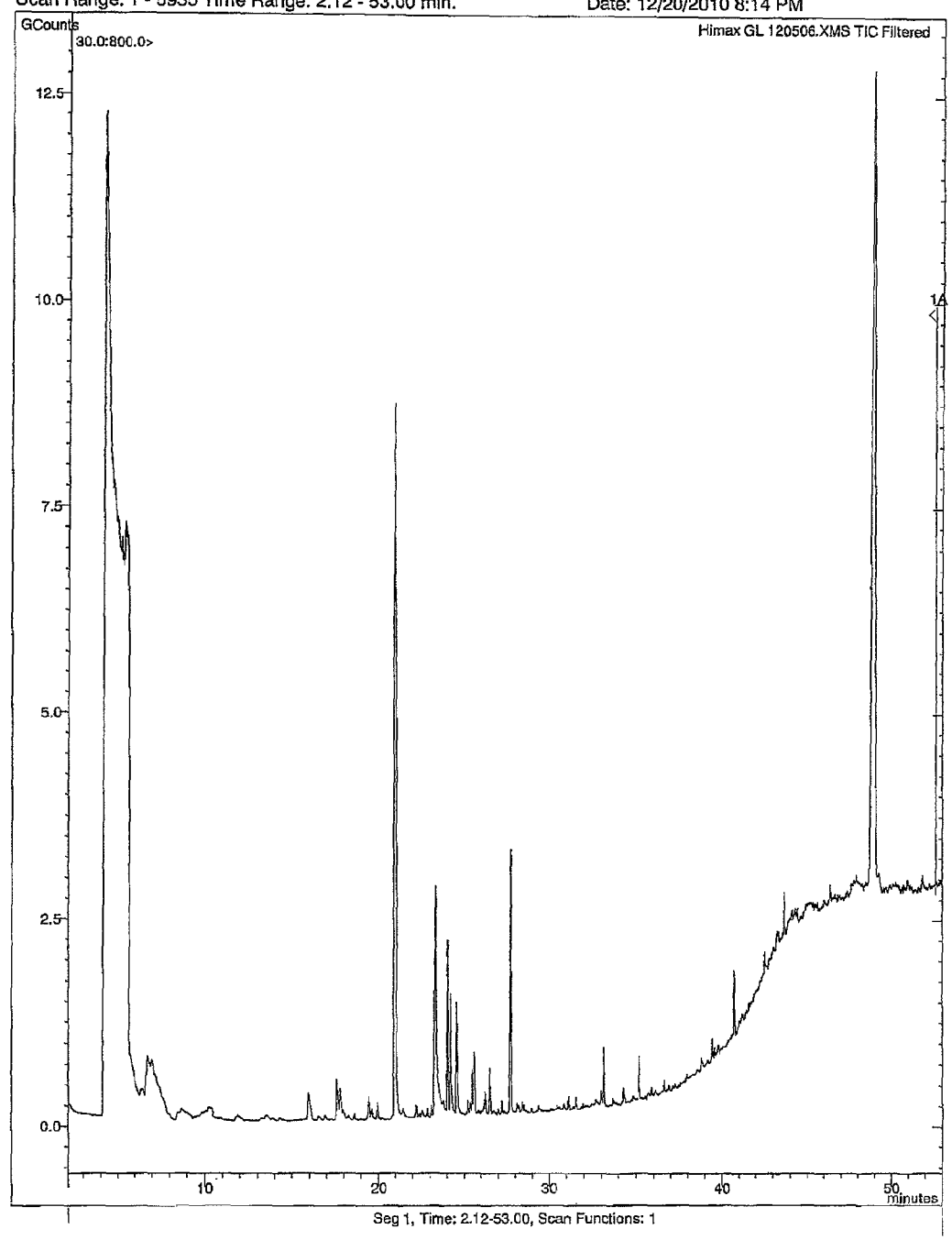

AROMA COMPONENTS FOR IMPROVING EGG FLAVOR, AND EGG FLAVOR ENHANCERS

TECHNICAL FIELD

The present invention relates to enhancement of egg aroma. The present invention is useful in the field of manufacturing foods or beverages.

BACKGROUND ART

Yeast extracts have been used in various foods as a seasoning derived from natural substances. Since yeast extracts contain fairly large amounts of the umami component glutamic acid, they are primarily used to complement umami (Patent Documents 1 to 3); in recent years, however, studies are also being made in expectation of an effect that glutamic acid might have on tastes other than umami.

For example, the present inventors previously reported that a yeast extract has an effect of enhancing flavor of a pork bone and a chicken bone (Patent Document 4) and that a yeast extract has an effect of enhancing fermentation feel or maturation feel of a fermented food (Patent Document 5).

However, in the technical art, a use of a yeast extract for providing aroma components has not been sufficiently discussed so far.

CITATION LIST

Patent Literature

Patent Document 1: JP Patent Publication No. 2005-102549 A (JP2005102549A)
Patent Document 2: JP Patent Publication No. H10-327802 (JP10327802)
Patent Document 3: WO99/16860
Patent Document 4: JP Patent Publication No. 2012-161268
Patent Document 5: JP Patent Publication No. 2012-161270

SUMMARY OF INVENTION

Technical Problem

The present inventors have long studied applications of the yeast extract with various kinds of characteristics on various food products. In such situations, the present invention aims at specifically determining components from the yeast extract which can provide an egg of a bird (herein after referred to simply as an "egg") itself or an egg product with egg aroma or enhance egg aroma of an egg itself or an egg product.

Solution to Problems

The present inventors have found that certain yeast extracts have aroma which is extremely similar to egg aroma. Further, the certain yeast extracts can impart egg aroma to a food product from the viewpoint of both taste and aroma, and quite unexpectedly, the certain yeast extracts make flavor of an egg itself or an egg product more pronounced; the present invention has been accomplished on the basis of these findings.

The present inventors specifically found that a composition comprising as ingredient(s) at least one component(s) selected from the following six aroma components which are contained in an extract of a certain kind of yeast:
(a) 3-(methylthio)1-propanol;
(b) benzaldehyde;
(c) 4-heptanol;
(d) trimethylpyrazine;
(e) methylpyrazine; or
(f) 2,5-dimethylpyrazine;
can impart egg aroma to an egg itself or an egg product and bring out the flavor of an egg itself or an egg product.

On the basis of these teaching, the present application provides the following invention:

[1] An agent for enhancing egg aroma comprising at least one component(s) as an ingredient selected from the group consisting of:
(a) 3-(methylthio)1-propanol;
(b) benzaldehyde;
(c) 4-heptanol;
(d) trimethylpyrazine;
(e) methylpyrazine; or
(f) 2,5-dimethylpyrazine.

[2] An agent for enhancing egg aroma comprising an yeast extract as an ingredient which comprises at least one component(s) selected from the group consisting of:
(a) 3-(methylthio)1-propanol;
(b) benzaldehyde;
(c) 4-heptanol;
(d) trimethylpyrazine;
(e) methylpyrazine; or
(f) 2,5-dimethylpyrazine.

[3] The agent for enhancing egg aroma according to [1] or [2] above, wherein the agent enhances egg flavor in the egg product.

[4] The agent for enhancing egg aroma according to any one of [1]-[3] above, wherein egg product is a food is an egg itself or a food containing an egg as a part thereof.

BRIEF DESCRIPTION OF DRAWINGS

FIG. 1 is a typical chart showing the result of GC/MS analysis of the aroma components in the invention product.

DESCRIPTION OF EMBODIMENTS

The present invention is directed to an application of an agent for enhancing egg aroma comprising at least one component(s) as an ingredient selected from certain 6 aroma components on an egg itself or an egg product. The present invention is also directed to an application of the yeast extract on an egg itself or an egg product.

As used herein, the term "eating quality" of a food product, unless otherwise described, refers to sensory elements which are recognized by a sense of taste and/or a sense of smell among various characteristics of the taste of food, and, especially to taste, flavor, aroma of the food product.

Unless otherwise noted, the term "eating quality" as used herein refers to those elements of characteristics relating to the palatability of foods which are perceived by the taste sense and/or olfactory sense and it specifically refers to taste, flavor, and aroma.

The term "aroma" as used herein refers to, among various elements of "eating quality", elements which are perceived by the olfactory sense, more specifically, to elements relating to flavor and aroma.

Unless otherwise noted, the term "agent" as used herein refers to a substance that is to be added to egg products being manufactured. The agent of the present invention contains at least one component(s) as an ingredient selected from the following 6 aroma components: (a) 3-(methylthio)1-propanol, (b) benzaldehyde, (c) 4-heptanol, (d) trimethylpyrazine, (e) methylpyrazine, or (f) 2,5-dimethylpyrazine, that are obtained as a result of analysis of aroma components of a yeast extract.

The term "at least one" as used herein refers to any one of the aroma components (a)-(f), any combination of two components selected from the aroma components (a)-(f), any combination of three components selected from the aroma components (a)-(f), any combination of four components selected from the aroma components (a)-(f), any combination of five components selected from the aroma components (a)-(f), or a combination of the six aroma components (a)-(f).

The agent used in the present invention can be any agent as far as it includes at least one component(s) selected from the six aroma components (a)-(f), and may comprise a yeast extract. Alternatively, the agent used in the present invention may be a yeast extract itself or a composition comprising a combination of a yeast extract and other additives such as carriers and/or additives that are acceptable as a food. Examples of a yeast extract comprising the aroma components of the present invention includes, but not limited to, HIMAX GL (TableMark Corporation), VERTEX IG 20 (TableMark Corporation), and so on.

Unless otherwise noted, the values indicated herein relating to the contents or recipes of aroma components and other ingredients in connection with the agent, a yeast extract, an agent for enhancing egg aroma, etc. are recited based on weight.

[Yeast Extract]

Unless otherwise noted, the term "yeast extract" as used herein refers to an extract obtained from a yeast cell by extraction with a solvent. A purified, concentrated, or dried product of the extract is also encompassed by the term "yeast extract." The yeast extract may be in a liquid or paste form, or even in a powder form.

The yeast extract used in the present invention includes not only the aroma components such as aroma constituents but also necessarily taste constituents according to the production process.

(a) Characteristic Aroma Components

The aroma components can be identified and quantitatively determined by any skilled artisan at will using known appropriate methods. For example, GC/MS is an effective means for such identification and quantitative determination. Those skilled in the art can refer to the disclosure of the Examples in the specification as specific conditions.

In the present invention, the present inventors identified aroma components which were enhanced when HIMAX GL (TableMark Corporation) was applied to a boiled whole egg by selecting aroma components among those of the boiled whole egg. The well-trained seven panelists have selected aroma components with especially high effect from those aroma components, and focused on the following six aroma components: (a) 3-(methylthio)1-propanol, (b) benzaldehyde, (c) 4-heptanol, (d) trimethylpyrazine, (e) methylpyrazine, or (f) 2,5-dimethylpyrazine, which have been used for further analysis.

As a result of these further investigation, it is clearly demonstrated that at least one of the following six aroma components: (a) 3-(methylthio)1-propanol, (b) benzaldehyde, (c) 4-heptanol, (d) trimethylpyrazine, (e) methylpyrazine, or (f) 2,5-dimethylpyrazine are aroma components effective for imparting egg flavor to an egg itself or an egg product, when they are applied to an egg itself or an egg product.

Process for Producing Yeast Extract

The yeast extracts of the present invention can be produced using yeasts that are obtained by optional breeding and selection from existing yeast strains and subsequently screening strains that are highly productive of glutamic acid.

The parent strain can be selected from among various yeasts suitable for eating. Preferred examples include yeasts of the genus *Saccharomyces* (e.g. *Saccharomyces cerebisiae, Saccharomyces rosei, Saccharomyces uvarum*, and *Saccharomyces chevalieri*) and yeasts of the genus *Candida* (e.g. *Candida utilis*).

For culturing the parent strain and variants, media that are commonly used for yeast culture, such as a YPD medium and a molasses medium, can be employed. If desired, glucose, sucrose, molasses, saccharified solution, etc. can be used as carbon sources; ammonium sulfate, ammonium chloride, nitrates, urea, ammonia, etc. can be used as nitrogen sources. Furthermore, inorganic salts of phosphoric acid, potassium, magnesium, zinc, copper, manganese, iron, etc. as well as vitamins and amino acids can also be added.

When a culture is harvested, yeast cells are obtained from it by any suitable means such as centrifugal separation and, after optional washing, the cells are subjected to hot water extraction, enzymatic decomposition and/or self-digestion, to thereby form an extract. Self-digestion is a method that depends on the action of the enzymes inherent in the yeast to solubilize it to form a yeast extract. Enzymatic decomposition is a method in which the enzyme is solubilized by an added decomposing enzyme to form a yeast extract. This method allows for adjustments in the contents of free amino acids or nucleic acids because the enzymatic reaction can be conveniently controlled by external addition of a suitable enzyme.

The enzymes to be used in enzymatic decomposition are not particularly limited as long as they are enzymes that are used to decompose biological components in the manufacture of foods; examples that can be used include enzymes capable of decomposing the cell walls of yeasts, proteases, nucleases, and combinations thereof.

The conditions for culture and yeast extract formation can be appropriately determined by any skilled artisan.

[Applications on an Egg Itself or an Egg Product]

The present invention provides an agent for enhancing egg aroma of an egg itself or an egg product comprising at least one component(s) selected from the six aroma components: (a) 3-(methylthio)1-propanol, (b) benzaldehyde, (c) 4-heptanol, (d) trimethylpyrazine, (e) methylpyrazine, or (f) 2,5-dimethylpyrazine, or comprising the yeast extract comprising any of the six aroma components.

The term "an enhancement of egg aroma of an egg itself or an egg product" as used herein covers an enhancement of egg flavor of an egg itself or an egg product (flavor having sweet aroma characteristic to an egg generated upon heating an egg or a food material containing an egg as a component). Whether or not any enhancement has been achieved and how great the enhancement is can be known through a comparative study based on sensory evaluation by one or more well-trained panelists. For example, two samples are provided, one being a subject food product containing the components to be evaluated (e.g., the yeast extract) and the other being a blank food product that is identical to the test food product except that it does not contain the components to be evaluated; panelists are asked to evaluate the similarity of flavor between the subject sample and the blank on a three- to five-point scoring scale.

The term "an egg itself or an egg product" as used herein, unless otherwise described, includes any types of food products and specifically includes a boiled egg itself, various food products using a boiled egg (for example, tartar sauce, prepared bread filling, and so on), various food products containing an egg as a component (for example, mayonnaise, dressing, pasta sauce, Japanese omelette, steamed egg custard, steamed egg hotchpotch, omelette, quiche, rolled omelette, noodles, fried rice, custard cream, pudding, cake, sponge cake, ice cream, egg (custard) tart, bread, crape, and so on).

The effective amount of the yeast extract in the present invention is, to an amount of the food product upon eating, at least 0.001%, preferably at least 0.01%, and in all conceivable cases, the effective amount is preferably not more than 1.0%, and more preferably not more than 0.5%. The upper limit of the effective amount should be determined, considering whether the yeast aroma like a bean is recognized with some strangeness.

In the manufacture of an egg itself or an egg product, the stage of addition of the agent for enhancing egg aroma of the present invention can be set appropriately and if the agent for enhancing egg aroma is a powder, it is preferably added after it is mixed with other powdery ingredients or dispersed in fat and oil.

The agent of the present invention can be in the form of seasoning compositions to be added to an egg itself or an egg product. Seasoning compositions permit addition of not only the agent for enhancing egg aroma (such as a yeast extract) but also various additives which are acceptable for use in foods. Examples of such additives include dextrin, lactose, and flavorings. The application of the seasoning compositions to an egg itself or an egg product can be designed in such a way that the concentration of an agent for enhancing egg aroma (e.g., the yeast extract) upon eating is within the above-noted preferred ranges of content in an egg itself or an egg product. For example, the seasoning compositions can be so formulated as to contain 4-40%, preferably 5-30%, more preferably 6-20%, of an agent for enhancing egg aroma (e.g., the yeast extract).

EXAMPLES

The present specification provides Examples below. The following examples are provided for illustrating the present invention in greater detail but not for restricting the present invention.

Example 1

Production of Yeast Extract (1-1) Culture of Yeast

From the library of the breadmaking yeast *Saccharomyces cerevisiae* in the possession of TableMark Co., Ltd., a seed yeast was selected with indices being the glutamic acid concentrations of the yeast extract to be obtained; the seed yeast was subjected to stirred culture and the cultured cells were separated and washed to give yeast cells.

(1-2) Yeast Extracts

The thus obtained yeast cells were treated enzymatically to obtain an extract which was heated to inactivate the enzyme and thereafter centrifuged for recovery of the yeast extract solution. Following heat sterilization at 70° C. for 20 minutes and subsequent filtering through 100 mesh, the filtrate was immediately dried with a spray dryer to give a powder of yeast extract.

The following two yeast extract, HIMAX GL (yeast extract A; TableMark Corporation) and VERTEX IG 20 (yeast extract B; TableMark Corporation), are used as representative examples of the yeast extracts of the present invention. As comparative examples, commercially available yeast extracts, i.e., yeast extract C (other company's product 1), yeast extract D (other company's product 2), and yeast extract E (other company's product 3) are used. In the following Examples, unless otherwise noted, the term "the invention product" as used herein refers to HIMAX GL (the yeast extract A in the present specification) or VERTEX IG 20 (the yeast extract B in the present specification), and the yeast extracts C-E refers to other company's products as described above.

(1-3) Analysis of the Aroma Components in the Yeast Extracts

Using GC/MS (apparatus name: GC: VARIAN CP-3800; GC/MS: VARIAN 300-MS), the aroma components of yeast extracts were analyzed. In Example 1, unless otherwise noted, analysis was conducted under the following conditions.

[Formula 1]

Column Oven
Coolant: Off
Enable Coolant at: 50 C.
Coolant Timeout: 20.00 min
Stabilization Time: 0.01 min

| Temp (C.) | Rate (C./min) | Hold (min) | Total (min) |
|---|---|---|---|
| 50 | 0.0 | 5.00 | 5.00 |
| 240 | 5.0 | 10.00 | 53.00 |

Rear PFPD Detector

| | | |
|---|---|---|
| Oven Power: | Off | MS Model: 300 |
| Temperature: | 50 C. | Ion Source: EI |
| Electronics: | Off | Scan mode: Centroid |
| Square Root Mode: | Off | SIM width: 0.700 amu total |
| Photomultiplier Voltage: | 510 V | End acquisition after 53.00 min. |
| Gate Delay: | 4.0 msec | Acquisition delay 2.00 min. |
| Gate Width: | 10.0 msec | Detector is set as fixed voltage 1500.00 volt |
| Trigger Level: | 200 mV | Turn off source at the end of run |
| Gain Factor: | 20 | No Special Programs |
| Use Auto Gain Factor?: | N | Scan Method Segment 1 ==== |
| | | CTD Gas Off |
| | | Scan time requested: 0.500 Sec. |
| | | Peak width selection: |
| | | Q1 Peak width Calibrated |
| | | Q3 Peak width Calibrated |
| | | Data collection is ON |

| Time (min) | Range | Autozero |
|---|---|---|
| Initial | 10 | yes |

Rear Type 15 Detector EFC

| | |
|---|---|
| Air 1 Flow: | 0.0 ml/min |
| H2 Flow: | 0.0 ml/min |
| Air 2 Flow: | 0.0 ml/min |

| | Q1FM | Q1LM | Q3FM | Q3LM | Coll Enrg | Dwell Time |
|---|---|---|---|---|---|---|
| (+) | 30.0 | 800.0 | | | | 0.500 |

CPAL Method:

| | |
|---|---|
| Injection Mode: | GC Headspace |
| Read Bar Codes: | Never |
| Required Syringe: | 1 ml Heated |
| Syringe Temperature: | 95.0 C. |
| Agitator Temperature: | 90.0 C. |
| Sample Incubation Time: | 1 hr. 0 min. 0 sec. |
| Agitator Speed: | 500 rpm |

| Agitation Cycle: | 2 sec On, 4 sec Off. |
|---|---|
| Plunger Fill Speed: | 100.000 ul/sec |
| Fill Strokes: | 1 |
| Viscosity Delay: | 1.000 sec |
| Injector: | Front |
| Pre-Injection Delay: | 0.500 sec |
| Plunger Inject Speed: | 250.000 ul/sec |
| Post-Injection Delay: | 0.500 sec |
| Syringe Flush Time: | 30 sec |
| GC Cycle Time (for Prep. Ahead): | 56 min. 0 sec. |

A representative chart regarding the yeast extract A is depicted in FIG. 1. The difference between production lots was hardly recognizable.

Example 2

Evaluation on Addition to Products

In the present Example, when various yeast extracts are added to an egg itself or an egg product as an agent of the present invention, status of imparting egg aroma to an egg itself or an egg product was determined by sensory test.

The present Example uses the yeast extract A (HIMAX GL; TableMark Corporation), the yeast extract B (VERTEX IG 20; TableMark Corporation), the yeast extract C (commercially available other company's product 1), the yeast extract D (commercially available other company's product 2), and the yeast extract E (commercially available other company's product 3), as an agent of the present invention.

An amount of each yeast extract added to the invention product is determined by comparing flavor of the food products with varying amounts and selecting an amount showing the most balanced aroma and flavor for each yeast extract.

(2-1) Boiled Egg

A boiled egg was prepared as hard-boiled by boiling a chicken egg for 9-10 minutes in boiling water. After peeling off the eggshell, the boiled egg was minced, to which each yeast extract was added in an amount of 0.05%.

(2-2) Mayonnaise Egg Filling

A mayonnaise egg filling was prepared in accordance with composition of the following table. A boiled egg used in this process was prepared by the same mincing process as that of (2-1) above, which was mixed with mayonnaise in an amount described in Table 1 to prepare the mayonnaise egg filling. Each yeast extract was added to the mayonnaise egg filling, in an amount of 0.05% to prepare samples.

TABLE 1

| Mayonnaise egg filling | |
|---|---|
| boiled egg | 40 |
| mayonnaise | 60 |

*Commercially available mayonnaise: (product of Kewpie Corp.)

Edible vegetable fat and oil (including soy bean oil), Egg yolk,
Brewed vinegar (including apple vinegar),
Dietary salt, Seasoning (amino acids),
Spices, Spices extract (2-3) Custard Filling A custard filling was prepared in accordance with composition of the following table. Specifically, milk combined with vanilla seeds was heated (but do not allow to boil) in a saucepan. Egg yolks and sugar were whisked in a bowl until well combined, to which cake flour was also mixed. Then, hot milk mixture was gradually poured over egg yolk mixture, and was heated over low heat, with stirring constantly, until custard thickens. Finally, just before termination of heating, each yeast extract was added to the custard in an amount of 0.03%.

TABLE 2

| Custard filling | |
|---|---|
| milk | 380 g |
| egg yolk | 3 eggs |
| sugar | 75 g |
| cake flour | 30 g |
| vanilla beans | 1 pod |

(2-4) Steamed Egg Hotchpotch

A mixture of materials for making a steamed egg hotchpotch was prepared in accordance with composition of the following table. Specifically, whole eggs were whisked in a bowl, to which instant bouillon, water, dietary salt, light soy sauce, and sweet cooking rice wine were added and filtered to prepare an egg hotchpotch mixture. Then, the egg hotchpotch mixture was put into a cup and steamed for about 10 minutes in a steamer to prepare a steamed egg hotchpotch. Each yeast extract was added to the egg hotchpotch mixture before steam in an amount of 0.05%.

TABLE 3

| Steamed egg hotchpotch (mixture) | |
|---|---|
| Whole egg | 2 eggs |
| Water | 400 g |
| Instant bouillon | 2 g |
| Dietary salt | 2 g |
| Light soy sauce | 8 g |
| Sweet cooking rice wine | 6 g |

(2-5) Sensory Evaluation

The well-trained seven panelists have conducted sensory evaluation for the boiled egg, the mayonnaise egg filling, the custard filling, and the steamed egg hotchpotch produced in (2-1)-(2-4). The results were summarized in Table 4.

In the Table 4, "−" indicates that the test sample contains substantially no differences in the egg aroma as compared with a food product without addition of each yeast extract, and "+++++" indicates that the egg aroma of the test sample was very strongly enhanced; the sensory evaluation was evaluated on a totally six-point scale according to "−" level and 5 positive level from "+" level to "+++++" level.

Addition of the yeast extract A, one of the invention products, exerted a strikingly significant effect, compared with the cases with addition of any other yeast extracts. Further, addition of the yeast extract B, another invention products, also exerted a strikingly significant effect, compared with the cases with addition of any other yeast extracts. Moreover, the yeast extracts C and D (other company's products) also exerted delicate egg flavor and were considered to be preferred examples. However, the yeast extract E (also other company's product) contains substantially no differences in the egg aroma as compared with a food product without addition of each yeast extract.

TABLE 4

| | egg (boild) | mayonnaise egg filling | custard filling | steamed egg hotchpotch |
|---|---|---|---|---|
| Amount of each yeast extract added (%) | 0.05 | 0.05 | 0.03 | 0.05 |
| Yeast extract A (HIMAX GL) | +++++ Addition of sweet aroma characteristic to an egg product. Addition of complex aroma. Addition of strong aromas like sulfur-containing compound. | +++++ Addition of strong aromas like sulfur-containing compound. Addition of sweet aroma characteristic of an egg product. | +++++ Addition of sweet flavor of custard originated from egg. Addition of vanilla-like flavor. Addition of deep and strong flavor characteristic of an egg product. Addition of sweet aroma characteristic to an egg product. | +++++ Addition of combination of strong aromas like sulfur-containing compound and mixed aroma of egg and soup stock of dried bonito. |
| Yeast extract B (VERTEX) | +++ Increasing flavor of quality of taste. | +++ Addition of only slightly sweet flavor. | +++ Addition of sweet egg flavor. | +++ Addition of flavor sweet egg flavor. |
| Yeast extract C (other company's product 1) | ++ Addition of only slightly sweet flavor. | ++ Addition of slightly oily, delicate sweet flavor. | ++ Addition of simple and delicate sweet flavor. | + Addition of only slightly sweet flavor. |
| Yeast extract D (other company's product 2) | + Weak effect of addition. | + Weak effect of addition. | ++ Addition of only slightly sweet aroma. | + Weak effect of addition. |
| Yeast extract E (other company's product 3) | – No effect of addition. | – No effect of addition. | – No effect of addition. | – No effect of addition. |

Example 3

Analysis and Evaluation of Aroma Components

In the present Example, scientific analysis of aroma components was conducted for the yeast extracts A-D, which were confirmed in Example 2 (Table 4) to demonstrate an effect of imparting egg flavor to a food product.

In this Example, the present inventors identified aroma components by selecting aroma components among those of a boiled whole egg which were enhanced when the yeast extract A (HIMAX GL) was applied to the boiled whole egg. As a result of the analysis, it is clearly demonstrated that there are some aroma components which were enhanced by an addition of the yeast extract A. Among those aroma components, the well-trained seven panelists have selected aroma components with especially high effect by sensory evaluation and focused on the following six aroma components: (a) 3-(methylthio)1-propanol, (b) benzaldehyde, (c) 4-heptanol, (d) trimethylpyrazine, (e) methylpyrazine, or (f) 2,5-dimethylpyrazine.

Subsequently, the six aroma components (a)-(f) in each yeast extracts A-E were analyzed in detail using GC/MS (apparatus name: GC: VARIAN CP-3800; GC/MS: VARIAN 300-MS). The results were summarized in Table 5.

TABLE 5

List of six aroma components contained in each yeast extract

| yeast extract (ppm) | (a) 3-(methylthio)1-propanol | (b) benzaldehyde | (c) 4-heptanol | (d) trimethylpyrazine | (e) methylpyrazine | (f) 2,5-dimethylpyrazine |
|---|---|---|---|---|---|---|
| A | 43.5 | 14.06 | 9.845 | 1.60 | 3.08 | 1.34 |
| B | 0.5 | 3.17 | 0.00 | 0.08 | 0.31 | 0.18 |
| C | 0.00 | 2.44 | 0.00 | 0.07 | 0.13 | 0.16 |
| D | 0.00 | 0.83 | 0.00 | 0.02 | 0.12 | 0.00 |
| E | 0.00 | 0.00 | 0.00 | 0.00 | 0.00 | 0.00 |

These results demonstrate that there are at least one aroma components from components (a)-(f) included in the yeast extracts A-D, the effects of which were confirmed in Example 2.

Example 4

Sensory Evaluation of Addition of Aroma Components to Boiled Egg

In the present Example, any combinations of aroma components (a)-(f) identified in Example 3 were added to the boiled egg prepared in (2-1) above; as a result, it makes it clear what kinds of changes are generated on egg aroma of the boiled egg by such addition.

One to six aroma components out of the aroma components (a)-(f) listed in Table 5 were selected, which were added to a boiled egg to evaluate an enhancement effect of egg aroma. The yeast extract A (HIMAX GL) which was confirmed to have an enhancement effect of egg aroma in Example 2 was used as a positive control. The results were summarized in Table 6.

TABLE 6

Effects of aroma components on boiled egg

| | |
|---|---|
| egg + a | ++ |
| egg + b | ++ |
| egg + c | ++ |
| egg + d | + |
| egg + e | + |
| egg + f | + |
| egg + ab | ++++ |
| egg + ac | +++ |
| egg + ad | +++ |
| egg + ae | +++ |
| egg + af | +++ |
| egg + bc | ++ |
| egg + bd | ++ |
| egg + be | ++ |
| egg + bf | ++ |
| egg + cd | ++ |
| egg + ce | ++ |
| egg + cf | ++ |
| egg + ef | ++ |
| egg + abc | +++++ |
| egg + abd | +++++ |
| egg + abe | +++++ |
| egg + abf | +++++ |
| egg + acd | ++++ |
| egg + ace | ++++ |
| egg + acf | ++++ |
| egg + ade | ++++ |
| egg + adf | ++++ |
| egg + aef | ++++ |
| egg + bcd | ++++ |
| egg + bce | ++++ |
| egg + bcf | ++++ |
| egg + bde | ++++ |
| egg + bdf | ++++ |
| egg + bef | ++++ |
| egg + cde | ++++ |
| egg + cdf | ++++ |
| egg + cef | ++++ |
| egg + abcd | ++++++ |
| egg + abce | ++++++ |
| egg + abcf | ++++++ |
| egg + abde | +++++ |
| egg + abef | +++++ |
| egg + bcde | +++++ |
| egg + bcdf | +++++ |
| egg + bdef | +++++ |
| egg + cdef | +++++ |
| egg + abcde | +++++++ |
| egg + abcef | +++++++ |
| egg + bcdef | ++++++ |
| egg + abcdef | ++++++++ |
| egg + GL | ++++++++++ |

These results demonstrate that, basically, as the number of aroma components added to the boiled egg increases, the greater the enhancement effect of egg aroma becomes.

Example 5

Sensory Evaluation of Addition of Aroma Components to Mayonnaise Egg Filling In the present Example, any combinations of aroma components (a)-(f) identified in Example 3 were added to the mayonnaise egg filling prepared in (2-2) above; as a result, it makes it clear what kinds of changes are generated on egg aroma of the mayonnaise egg filling by such addition.

One to six aroma components out of the aroma components (a)-(f) listed in Table 5 were selected, which were added to a mayonnaise egg filling to evaluate an enhancement effect of egg aroma. The yeast extract A (HIMAX GL) which was confirmed to have an enhancement effect of egg aroma in Example 2 was used as a positive control. The results were summarized in Table 7.

TABLE 7

Effects of aroma components on mayonnaise egg filling

| | |
|---|---|
| egg filling + a | ++ |
| egg filling + b | ++ |
| egg filling + c | ++ |
| egg filling + d | + |
| egg filling + e | ++ |
| egg filling + f | + |
| egg filling + ab | ++++ |
| egg filling + ac | +++ |
| egg filling + ad | +++ |
| egg filling + ae | +++ |
| egg filling + af | +++ |
| egg filling + bc | ++ |
| egg filling + bd | ++ |
| egg filling + be | +++ |
| egg filling + bf | ++ |
| egg filling + cd | ++ |
| egg filling + ce | ++ |
| egg filling + cf | ++ |
| egg filling + ef | ++ |
| egg filling + abc | +++++ |
| egg filling + abd | +++++ |
| egg filling + abe | ++++ |
| egg filling + abf | +++++ |
| egg filling + acd | ++++ |
| egg filling + ace | ++++ |
| egg filling + acf | ++++ |
| egg filling + ade | ++++ |
| egg filling + adf | ++++ |
| egg filling + aef | +++ |
| egg filling + bcd | ++++ |
| egg filling + bce | ++++ |
| egg filling + bcf | +++++ |
| egg filling + bde | ++++ |
| egg filling + bdf | ++++ |
| egg filling + bef | +++++ |
| egg filling + cde | ++++ |
| egg filling + cdf | ++++ |
| egg filling + def | ++++ |
| egg filling + abcd | ++++++ |
| egg filling + abce | ++++++ |
| egg filling + abcf | ++++++ |
| egg filling + abde | +++++ |
| egg filling + abef | +++++ |
| egg filling + bcde | +++++ |
| egg filling + bcdf | +++++ |
| egg filling + bdef | +++++ |
| egg filling + cdef | +++++ |
| egg filling + abcde | +++++++ |
| egg filling + abcef | +++++++ |
| egg filling + bcdef | ++++++ |

TABLE 7-continued

Effects of aroma components on mayonnaise egg filling

| | |
|---|---|
| egg filling + abcdef | ++++++++ |
| egg filling + GL | ++++++++++ |

These results demonstrate that, basically, as the number of aroma components added to the mayonnaise egg filling increases, the greater the enhancement effect of egg aroma becomes.

Example 6

Sensory Evaluation of Addition of Aroma Components to Custard Filling

In the present Example, any combinations of aroma components (a)-(f) identified in Example 3 were added to the custard filling prepared in (2-3) above; as a result, it makes it clear what kinds of changes are generated on egg aroma of the custard filling by such addition.

One to six aroma components out of the aroma components (a)-(f) listed in Table 5 were selected, which were added to a custard filling to evaluate an enhancement effect of egg aroma. The yeast extract A (HIMAX GL) which was confirmed to have an enhancement effect of egg aroma in Example 2 was used as a positive control. The results were summarized in Table 8.

TABLE 8

Effects of aroma components on custard filling

| | |
|---|---|
| custard + a | ++ |
| custard + b | ++ |
| custard + c | ++ |
| custard + d | + |
| custard + e | + |
| custard + f | ++ |
| custard + ab | ++++ |
| custard + ac | +++ |
| custard + ad | +++ |
| custard + ae | +++ |
| custard + af | +++ |
| custard + bc | ++ |
| custard + bd | ++ |
| custard + be | ++ |
| custard + bf | +++ |
| custard + cd | ++ |
| custard + ce | ++ |
| custard + cf | ++ |
| custard + ef | ++ |
| custard + abc | +++++ |
| custard + abd | +++++ |
| custard + abe | ++++ |
| custard + abf | ++++ |
| custard + acd | ++++ |
| custard + ace | +++++ |
| custard + acf | ++++ |
| custard + ade | ++++ |
| custard + adf | ++++ |
| custard + aef | +++ |
| custard + bcd | ++++ |
| custard + bce | ++++ |
| custard + bcf | ++++ |
| custard + bde | +++++ |
| custard + bdf | ++++ |
| custard + bef | +++++ |
| custard + cde | ++++ |
| custard + cdf | ++++ |
| custard + def | ++++ |
| custard + abcd | ++++++ |
| custard + abce | ++++++ |
| custard + abcf | ++++++ |
| custard + abde | +++++ |
| custard + abef | +++++ |
| custard + bcde | +++++ |
| custard + bcdf | +++++ |
| custard + bdef | +++++ |
| custard + cdef | +++++ |
| custard + abcde | +++++++ |
| custard + abcef | +++++++ |
| custard + bcdef | ++++++ |
| custard + abcdef | ++++++++ |
| custard + GL | ++++++++++ |

These results demonstrate that, basically, as the number of aroma components added to the custard filling increases, the greater the enhancement effect of egg aroma becomes.

Example 7

Sensory Evaluation of Addition of Aroma Components to Steamed Egg Hotchpotch In the present Example, any combinations of aroma components (a)-(f) identified in Example 3 were added to the steamed egg hotchpotch prepared in (2-4) above; as a result, it makes it clear what kinds of changes are generated on egg aroma of the steamed egg hotchpotch by such addition.

One to six aroma components out of the aroma components (a)-(f) listed in Table 5 were selected, which were added to a steamed egg hotchpotch to evaluate an enhancement effect of egg aroma. The yeast extract A (HIMAX GL) which was confirmed to have an enhancement effect of egg aroma in Example 2 was used as a positive control. The results were summarized in Table 9.

TABLE 9

Effects of aroma components on steamed egg hotchpotch

| | |
|---|---|
| steamed egg hotchpotch + a | ++ |
| steamed egg hotchpotch + b | ++ |
| steamed egg hotchpotch + c | ++ |
| steamed egg hotchpotch + d | + |
| steamed egg hotchpotch + e | + |
| steamed egg hotchpotch + f | ++ |
| steamed egg hotchpotch + ab | ++++ |
| steamed egg hotchpotch + ac | +++ |
| steamed egg hotchpotch + ad | +++ |
| steamed egg hotchpotch + ae | +++ |
| steamed egg hotchpotch + af | +++ |
| steamed egg hotchpotch + bc | ++ |
| steamed egg hotchpotch + bd | ++ |
| steamed egg hotchpotch + be | ++ |
| steamed egg hotchpotch + bf | +++ |
| steamed egg hotchpotch + cd | ++ |
| steamed egg hotchpotch + ce | ++ |
| steamed egg hotchpotch + cf | ++ |
| steamed egg hotchpotch + ef | ++ |
| steamed egg hotchpotch + abc | +++++ |
| steamed egg hotchpotch + abd | +++++ |
| steamed egg hotchpotch + abe | ++++ |
| steamed egg hotchpotch + abf | ++++ |
| steamed egg hotchpotch + acd | ++++ |
| steamed egg hotchpotch + ace | +++++ |

TABLE 9-continued

Effects of aroma components on steamed egg hotchpotch

| | |
|---|---|
| steamed egg hotchpotch + acf | ++++ |
| steamed egg hotchpotch + ade | ++++ |
| steamed egg hotchpotch + adf | ++++ |
| steamed egg hotchpotch + aef | +++ |
| steamed egg hotchpotch + bcd | ++++ |
| steamed egg hotchpotch + bce | ++++ |
| steamed egg hotchpotch + bcf | ++++ |
| steamed egg hotchpotch + bde | +++++ |
| steamed egg hotchpotch + bdf | ++++ |
| steamed egg hotchpotch + bef | +++++ |
| steamed egg hotchpotch + cde | ++++ |
| steamed egg hotchpotch + cdf | ++++ |
| steamed egg hotchpotch + def | ++++ |
| steamed egg hotchpotch + abcd | ++++++ |
| steamed egg hotchpotch + abce | ++++++ |
| steamed egg hotchpotch + abcf | ++++++ |
| steamed egg hotchpotch + abde | +++++ |
| steamed egg hotchpotch + abef | +++++ |
| steamed egg hotchpotch + bcde | +++++ |
| steamed egg hotchpotch + bcdf | +++++ |
| steamed egg hotchpotch + bdef | +++++ |
| steamed egg hotchpotch + cdef | +++++ |
| steamed egg hotchpotch + abcde | +++++++ |
| steamed egg hotchpotch + abcef | +++++++ |
| steamed egg hotchpotch + bcdef | ++++++ |
| steamed egg hotchpotch + abcdef | ++++++++ |
| steamed egg hotchpotch + GL | ++++++++++ |

These results demonstrate that, basically, as the number of aroma components added to the steamed egg hotchpotch increases, the greater the enhancement effect of egg aroma becomes.

Example 8

Effective Range of Each Aroma Components in Custard Filling

The present Example was conducted to calculate the effective range of the six aroma components of the present invention to be added to the custard filling.

Specifically, each components were actually added to the custard filling and the well-trained seven panelists have conducted sensory evaluation and calculated the minimum and maximum values of the yeast extract. The results are shown in Table 10.

TABLE 10

| ppm | Amount included in yeast extract A | Minimum value in yeast extract A | Maximum amount in yeast extract A |
|---|---|---|---|
| (a) 3-(methylthio)1-propanol | 43.5 | 0.00069 | 152.1 |
| (b) benzaldehyde | 14.06 | 0.00015 | 42.5 |
| (c) 4-heptanol | 9.845 | 0.00012 | 34.3 |
| (d) trimethylpyrazine | 1.60 | 0.00025 | 4.89 |
| (e) methylpyrazine | 3.08 | 0.00032 | 10.56 |
| (f) 2,5-dimethylpyrazine | 1.34 | 0.00021 | 3.9 |

These results demonstrates that each aroma components can effect if the level of these components are between the minimum value and maximum value of HIMAX GL (i.e., the yeast extract A).

What is claimed is:

1. A composition with enhanced egg aroma comprising:
   i) an egg or egg product; and
   ii) a composition to enhance egg aroma consisting essentially of:
   an effective amount of at least six aroma components and a food carrier or additive,
   wherein the at least six aroma components are:
   (a) 3-(methylthio)1-propanol;
   (b) benzaldehyde;
   (c) 4-heptanol;
   (d) trimethylpyrazine;
   (e) methylpyrazine; and
   (f) 2,5-dimethylpyrazine, and
   wherein the composition comprises at least (a) 3-(methylthio)1-propanol in an amount of 0.5 ppm to 152.1 ppm.

2. The composition with enhanced egg aroma according to claim 1, wherein the composition enhances egg flavor in the egg product.

3. The composition with enhanced egg aroma according to claim 1, wherein said at least six aroma components are from yeast extract, and wherein the yeast extract is present in an amount of 0.01 to 0.5%.

4. The composition with enhanced egg aroma according to claim 1, comprising (a) 3-(methylthio)1-propanol in an amount of 0.5-43.5 ppm.

5. The composition with enhanced egg aroma according to claim 1, wherein the egg or egg product is a food containing egg as a part thereof.

6. The composition with enhanced egg aroma according to claim 1, wherein the egg or egg product is a food product using a boiled egg.

7. The composition with enhanced egg aroma according to claim 1, wherein the egg or egg product is selected from the group consisting of mayonnaise, dressing, pasta sauce, Japanese omelet, steamed egg custard, steamed egg hotchpotch, omelet, quiche, rolled omelet, noodles, fried rice, custard cream, pudding, cake, sponge case, ice cream, egg (custard) tart, bread, and crape.

* * * * *